United States Patent [19]

Lester et al.

[11] 4,273,145

[45] Jun. 16, 1981

[54] HIGH MOLECULAR WEIGHT VINYL ACRYLIC COMBINED WITH LOW MOLECULAR WEIGHT VINYL ACETATE-MALEATE FOR CONTROLLED PERMANENT TACK AND METHOD OF MAKING SAME

[75] Inventors: David Lester, Arlington; Robert R. Alexander, Waltham, both of Mass.

[73] Assignee: Polymerics, Inc., Waltham, Mass.

[21] Appl. No.: 48,053

[22] Filed: Jun. 13, 1979

[51] Int. Cl.³ ............................................. C08L 31/04
[52] U.S. Cl. ..................................... 132/1 R; 132/73; 260/17 A; 424/61; 264/219; 264/316; 525/208
[58]° Field of Search ............... 525/225, 221, 222, 208; 260/17 R, 17 A; 264/219, 316; 424/61; 132/1 R, 73

[56] References Cited

U.S. PATENT DOCUMENTS

| | | | |
|---|---|---|---|
| 2,633,139 | 3/1953 | Pettey ..................................... | 132/73 |
| 3,478,756 | 11/1969 | Sautter et al. ......................... | 424/61 |
| 3,580,972 | 5/1971 | Isaksen et al. ....................... | 525/221 |

*Primary Examiner*—Earl A. Nielsen

[57] ABSTRACT

An unsupported decorative film of a polymeric composition having controlled permanent tack, the polymeric composition being a blend of 86 to 88% of a polyvinyl acetate-acrylic copolymer of high molecular weight and low residual tack and 12 to 14% of a polyvinyl acetate-maleate copolymer of low molecular weight and high residual tack. Other chemicals may be added to the blend to control color, viscosity and resistance to microorganisms. A casted film of this composition adheres to most surfaces, but may be forcefully removed and relocated. The film is used for decorative art pieces.

8 Claims, No Drawings

HIGH MOLECULAR WEIGHT VINYL ACRYLIC COMBINED WITH LOW MOLECULAR WEIGHT VINYL ACETATE-MALEATE FOR CONTROLLED PERMANENT TACK AND METHOD OF MAKING SAME

BACKGROUND OF THE INVENTION

1. Field of the Invention

This invention pertains to an unsupported decorative film of a polymeric composition having controlled permanent tack for temporary adhesion to all types of surfaces and a method of making said film. The film may be used for decorative purposes, may or may not be transparent to light and may be colored. The decorative formed film of this invention is of value in the field of arts and crafts.

2. Description of the Prior Art

The principal object of this invention is to provide a decorative film as an arts and crafts medium which is tough, flexible and permanently tacky. The film is designed to be arranged in a decorative, physical form and to be itself decorative. In order to be able to display this decorative formed film and to change the display from time to time, it is necessary that this decorative formed film be able to stick to many types of surfaces and have a permanent tack. The person using this art form can make a decorative art creation in the form of a film which may or may not be transparent to light, yet can bear color, much like tinted glass. To achieve this principal object, the film must be tough, flexible and adhesive. The most important property of this decorative formed film is that it have the proper permanent tack which will allow the formed film piece to be placed upon any surface, this placement supporting the decorative film piece, and which will allow the removal of the decorative film piece from one surface and its replacement on another surface without any loss of tack.

Thus, the polymeric composition of this invention must possess some very unique properties. In a search of the literature and of the marketplace, the inventors found that each apparently suitable polymer had one or more shortcomings. The inventors were searching for a film forming polymeric composition with the appropriate controlled permanent tack. The tack level has to be of such a nature as to stick to many different kinds of surfaces over a broad temperature range.

A permanently tacky adhesive or compound is not new or novel. There are many such compositions in use. However, these formulations were designed mainly as adhesives to stick one object to another object on a temporary basis, such as the adhesive on a finger bandage. But these adhesive masses would not be acceptable to support or make the decorative formed films of this invention.

Tack is a very difficult property to define. It certainly implies stick, as for example, the human skin must have a degree of tack to objects, or our hand would not be able to pick up or hold things rather easily. It is not only a chemical property as defined by molecular weight, solubility, or incompatibility of substances, but is also a mechanical property, as defined by displacement, deformation and contact. So, it is known that both chemical and mechanical considerations would have to be employed. It is also known that simple physical testing was not sufficient, for tack is too complex a property to evaluate with one simple test, but rather it would require painstakingly long empirical studies of trial and error and of end use evaluation on all kinds of surfaces, under all kinds of conditions of heat, moisture, and temperature.

It is common knowledge that tack, or permanent tack, can be achieved by the 60–40 principle. This says that 60 parts of a high molecular resin mixed with 40 parts of a low molecular resin or compound will result in a tacky mass. This principle holds quite well. However, compositions of this design were not acceptable to the requirements of this invention. They suffered from draw backs of cold flow, creep, migration, extreme variability of tack as to temperature, and complete loss of tack on exposure to moisture. Long term aging became a problem, the degree of tack would gradually lessen, and a lot of the composition in time would lose their tack.

To have a clear film that is transparent, the polymeric composition must be amorphous. This requirement eliminates a lot of polymers. However, amorphous or noncrystalline structures are more prone to permanent change when exposed to forces of chemical or mechanical stress. Hence, the amorphous polymer used in this invention must be very stable chemically, and not too thermoplastic so as to hold an acceptable level of physico-mechanical stability, especially as it relates to tack.

SUMMARY OF THE INVENTION

This invention provides a new art and craft medium not heretofore available. A special polymeric composition is provided in a suitable container from which the artisan can cast a liquid composition into a decorative form. The casting phase is done on a non-porous, release, plastic sheeting such as polypropylene, polyethylene or polyester film, or resin-coated release papers, whereby the coating is polypropylene, polyethylene, polyester, silicon or various hydrocarbon waxes. The liquid composition then sets to a film that is tough, flexible and permanently tacky. The casting phase is done on cellophane sheeting or similar nonporous material. With the polymeric film-forming composition, an edging compound is provided that for framing the casting liquid. After the casting phase, the composition is allowed to act, whereby a clear film results that is transparent to light, bearing color and form that then can be supportably affixed to any surface. The artpiece can be removed and affixed to many different objects such as windows, walls, furniture, or any kind of surface.

The following polymeric composition satisfies this invention. The polymeric part of the final composition consists of two polymer entities:

Polymer I—A polyvinyl acetate-acrylic copolymer of high molecular weight, and low residual tack, and, Polymer II—A polyvinyl acetate-maleate copolymer of low molecular weight, and high residual tack.

Both of these polymers are of special design and are made especially for this invention.

Polymer I readily forms a film that is low in tack, glossy, very clear, and flexible. Polymer II readily forms a film that is very high in tack, glossy, very clear and soft.

Polymer I is very different from Polymer II. Polymer I is not a tacky Polymer. It is tough and very stable to the influence of moisture or temperature. However, it has a very critical performance factor, and that is that it will absorb 10–12% moisture. This feature is extremely important to achieve proper tack control. Polymer II is very tacky and has excellent moisture resistance, but mechanically offers no stability.

In the final composition a blend of Polymer I and Polymer II was found to be necessary and critical to obtain controlled permanent tack. This blend ratio was found to be:

Polymer I; 88–86
Polymer II; 12–14 this blend ratio gave the final casted film just the right adhesive tack properties. The coated film of the proper blend of Polymer I and II was tried for adhesion to all kinds of surfaces such as metal, wood, paper, paper board, coated cloth, painted woods, and glass, under all sorts of conditions of humidity and temperature. The adhesive or stick feature of the blend film was excellent under all extremes of humidity from 20–90%, and temperatures from 0° C. to 30° C. Metallic and glass surfaces will have condensed moisture which can destroy tack, but the blend film will pickup this moisture without losing tack, and transport it through the film in time. This is a very important performance feature, for without this feature, the film would not stick to moisture contaminated surfaces.

Other chemicals may be added to obtain color, viscosity control and resistance to micro-organisms. The preferred composition contains a color and may be supplied to the arts and crafts field in many basic colors so that most colors can be achieved by blending the basics. The artisan will first frame the art-piece with a black color in about a ¼ line, allow it to partially dry, then fill in with the appropriate colors to cast the final film art. After it has dried, or set, it is now ready to be supportively attached to a surface for display.

DESCRIPTION OF THE PREFERRED EMBODIMENT

This invention pertains to an unsupported decorative formed film of a polymeric composition having controlled permanent tack for temporary adhesion to all types of surfaces, which film is color bearing and may or may not be transparent. The formed film must be tough, flexible, adhesive and have a controlled permanent tack which allows for film piece placement on any surface over a broad temperature range.

In the preferred embodiment, the following polymeric composition satisfies the objects of this invention. The polymeric part of the final composition consists of two polymer entities:

Polymer I—A polyvinyl acetate-acrylic copolymer of high molecular weight, and low residual tack, and, Polymer II—A polyvinyl acetate-maleate copolymer a low molecular weight, and high residual tack.

Both of these polymers are of special design and are made especially for this invention.

The making and composition of Polymer I is prepared as follows. Polymer I is made by emulsion polymerization under a blanket of nitrogen. The formula is:

| Ingredients | Parts By Weight |
|---|---|
| Vinyl acetate | 77.0 |
| Itaconic acid | 1.5 |
| Ethyl acrylate | 12.0 |
| Glycidyl methacrylate | 2.5 |
| Thiodiethylene glycol | 4.0 |
| Sodium Lauryl sulfate | 2.5 |
| Ammonium persulfate | 0.4 |

-continued

| Ingredients | Parts By Weight |
|---|---|
| Water | 100.0 T.T.S 50% |

The water is charged to the reactor, then 14 parts of vinyl acetate 1.5 parts of itaconic acid, 2.5 glycidyl methacrylate, 4.0 parts of thiodiethylene glycol, 2.5 parts of sodium lauryl sulfate, an 0.4 parts of ammonium persulfate are added. This mixture is then heated to 84° C., at which time a mixture of 63 parts of vinyl acetate and 12 parts of ethyl acrylate are added dropwise to the reactor. The temperature is maintained while the addition is made over a period of 45 minutes. The temperature then rises to 94° C. and the conversion is complete to about 96 to 98%. The latex solids are about 47 to 49%. The batch is cooled and filtered.

The making and composition of Polymer II is as follows. Polymer II is made by emulsion polymerization under a blanket of nitrogen. The formula is:

| Ingredients | Parts By Weight |
|---|---|
| vinyl acetate | 56.0 |
| methacrylic acid | 1.5 |
| dioctyl maleate | 37.0 |
| sodium lauryl sulfate | 3.5 |
| hydroxyethyl cellulose | 1.5 |
| ammonium persulfate | 0.6 |
| water | 100.0 |

The water is charged to the reactor, then 8 parts of vinyl acetate, 1.5 parts of methacrylic acid 5.5 parts of dioctyl maleate, 3.5 parts of sodium lauryl sulfate, 1.5 parts of hydroxy ethyl cellulose (MW2-4000), and 0.6 parts of ammonium persulfate are added. This is heated to 84° C., at which time a mixture of 48 parts of vinyl acetate and 31.5 parts of dioctyl maleate are added dropwise to the reactor. The temperature is maintained while the addition made over a period of 90 minutes. The temperature rises to 96–97° C. The conversion is complete to about 96–97%. The latex solids are about 47 to 48%. The batch is cooled and filtered.

Polymer I readily forms a film that is low in tack, glossy, very clear, and flexible. A 4 mil film has the following typical properties:

| | |
|---|---|
| tensile strength | 150–200 psi |
| % elongation at break | 175–225 |
| tack by sq. in. foot, +20° C. | 4–5 lbs. |
| tack by sq. in. foot, 0° C. | 2 lbs. |
| melting point | 140–145° C. |
| moisture regain; 90% R.H. 30° C. | 6–7% |
| moisture regain; 70% R.H. 20° C. | 5–6% |
| moisture regain; 50% R.H. 20° C. | 5–6% |
| moisture regain; 20% R.H. 20° C. | 4–5% |
| moisture pick up | 10–12% |
| % creep, 20° C., 24 hrs. | 5–6% |
| resistance to sunlight | excellent |
| molecular weight | million and above |

Polymer II readily forms a film that is very high in tack, glossy, very clear and soft. A 4 mil film has the following typical properties:

| | |
|---|---|
| tensile strength | 10–15 psi |
| % elongation at break | 2000% |
| tack by 1 sq. in. foot, 20° C. | 40–50 lbs. |
| tack by 1 sq. in. foot, 0° C. | 35–45 lbs. |
| melting point | 120–125° C. |

| | |
|---|---|
| moisture regain, 90%, R.H. 30° C. | 0.5-0.75% |
| moisture regain, 70%, R.H. 20° C. | 0.5-0.75% |
| moisture regain, 50%, R.H. 20° C. | 0.5-0.75% |
| moisture regain, 20%, R.H. 20° C. | 0.5-0.75% |
| moisture pick up | 1-2% |
| % creep, 20° C., 24 hrs. | extreme |
| resistance to sunlight | excellent |
| molecular weight | 55-35,000 |

From the above physical data, it can be seen that Polymer I is very different from Polymer II. Polymer I is not a tacky polymer. It is tough and very stable to the influence of moisture or temperature. However, it has a very critical performance factor, and that is that it will absorb 10-12% moisture and this feature is extremely important to achieve proper tack control. Polymer II is very tacky, excellent moisture resistance, but mechanically offers no stability.

In the preferred embodiment, a blend of Polymer I and Polymer II was found to be necessary and critical to obtain controlled permanent tack. This blend ratio was found to be:

Polymer I; 88-86
Polymer II; 12-14

This blend ratio gives the final casted film just the right adhesive tack properties. The typical film properties of a blend of Polymer I and Polymer II is as follows:

| | |
|---|---|
| tensile strength | 140-180 psi |
| % elongation at break | 200-250 |
| tack by 1 in. foot, 20° C. | 7-8 lbs. |
| tack by 1 in. foot, 0° C. | 7-8 lbs. |
| melting point | 140° C. |
| moisture regain, 90% R.H. 30° C. | 5-7% |
| moisture regain, 70% R.H. 20° C. | 5-6% |
| moisture regain, 50% R.H. 20° C. | 5-6% |
| moisture pickup | 9-10% |
| % creep, 20° C. 24 hrs. | 7-10% |
| resistance to sunlight | excellent |
| molecular weight | mixed, but millions |

The coated film of the proper blend of Polymer I and II was tried for adhesion to all kinds of surfaces such as metal, wood, paper, paper board, coated cloth, painted woods, and glass, under all sorts of conditions of humidity and temperature. The adhesive or stick feature of the blend film was excellent under all extremes of humidity from 20-90%, and temperatures from 0° C. to 30° C. Metallic and glass surfaces will have condensed moisture which can destroy tack, but the blend film will pickup this moisture without losing tack, and transport it through the film in time; this is a very important performance feature, for without this feature, the film would not stick to moisture contaminated surfaces.

It should be understood that the stick performance, or adhesiveness to the various surfaces, under varied conditions was adjudged by end-use testing. The initial stick performance was noted, whereby when the art-piece is affixed to a surface, either it would stick immediately and sufficiently, or it would simply not stick, which resulted in a performance failure. If the art-piece would stick acceptably, initially, then it must stay affixed in place, indefinitely, until forceably removed, under varied environmental conditions. Only a polymeric composition as defined above, a blend of Polymer I and Polymer II would meet the stringent requirement of initial stick, and long-term stable surface adhesion.

Once the proper polymeric composition is obtained, then a final formula is prepared to include such chemicals as are necessary to obtain color, viscosity control, and resistance to micro-organisms. The final formula for the film casting composition is —

| Ingredients | Parts By Weight |
|---|---|
| 1. Polymer I | 88-86 |
| 2. Polymer II | 12-14 |
| 3. Hydroxethyl cellulose | 0.08-0.14 |
| 4. Poly acrylic acid | 0.035-0.15 |
| 5. Pigment Colorant Dispersion | 2-10 |
| 6. Fungicide | 0.004-0.10 |
| 7. Ammonium Hydroxide | 0.14 |

The above composition contains a color, and obviously, it is supplied to the Arts and Craft field in many basic colors, so that most colors can be achieved by blending the basics.

This polymeric composition is provided in a suitable container from which the artisan casts the liquid composition into a decorative form. The liquid composition then sets to a film that is tough, flexible and permanently tacky. The casting phase is done on a non-porous, plastic, release sheeting or a resin-coated release paper. With the polymeric film-forming composition an edging compound is provided that provides the framing for the casting liquid. After the casting phase, the composition is allowed to set, whereby a clear film results that is transparent to light, bearing color and form that now can be supportably, affixed to any surface. The art-piece can be removed and affixed to many different objects such as windows, walls, furniture, etc., this is a distinct advantage. For colored art pieces, the artisan will first frame the art-piece with a black color in about a ¼″ line, allow it to partially dry, then fill in with the appropriate colors to cast the final film art. After it has dried, or set, it is now ready to be supportively attached to a surface for display.

We claim:

1. A polymeric composition having controlled permanent tack for use in making unsupported decorative films comprising:

86 to 88 parts of a vinyl acetate-acrylic copolymer of high molecular weight in excess of one million and low residual tack;

14 to 12 parts of a vinyl acetate-maleate copolymer of low molecular weight in the range of 55-35,000 and high residual tack, wherein said vinyl acetate-acrylic copolymer comprises,

| Ingredients | Parts By Weight |
|---|---|
| Vinyl acetate | 77.0 |
| Itaconic acid | 1.5 |
| Ethyl acrylate | 12.0 |
| Glycidyl methacrylate | 2.5 |
| Thiodiethylene glycol | 4.0 |
| Sodium Lauryl sulfate | 2.5 |
| Ammonium persulfate | 0.4 |
| Water | 100.0 T.T.S 50% | and, wherein said polyvinyl acetate-maleate copolymer comprises,

| Ingredients | Parts by Weight |
|---|---|
| Vinyl acetate | 56.0 |
| Methacrylic acid | 1.5 |
| Dioctyl maleate | 37.0 |
| Sodium lauryl sulfate | 3.5 |

-continued

| Ingredients | Parts by Weight |
| --- | --- |
| Hydroxyethyl cellulose | 1.5 |
| Ammonium persulfate | 0.6 |
| Water | 100.0 |

2. The polymeric composition of claim 1 further comprising:

| Ingredients | Parts By Weight |
| --- | --- |
| Hydroxethyl cellulose | 0.08–0.14 |
| Poly acrylic acid | 0.035–0.15 |
| Pigment Colorant Dispersion | 2–10 |
| Fungicide | 0.004–0.10 |
| Ammonium Hydroxide | 0.14 |

3. A process for casting a polymeric film with controlled permanent tack with the composition of claim 1 which comprises:
   edging a sheet of non-porous material in the shape of desired film;
   pouring said polymeric composition on said sheet within said edges;
   allowing said polymeric composition to set;
   removing said edging and said non-porous sheet.

4. A process for casting a polymeric film with controlled permanent tack with the composition of claim 2 which comprises:
   edging a sheet of non-porous material in the shape of the desired film;
   pouring said polymeric composition on said sheet within said edges;
   allowing said polymeric composition to set;
   removing said edging and said non-porous sheet.

5. A method of making a film forming polymeric composition by emulsion polymerization under a blanket of nitrogen comprising the steps of:

charging 100 parts by weight of water to a reactor;
   adding 14 parts by weight of vinyl acetate;
   adding 1.5 parts by weight of itaconic acid;
   adding 2.5 parts by weight of glycidyl methacrylate;
   adding 4.0 parts by weight of thiodiethylene glycol;
   adding 2.5 parts by weight of sodium lauryl sulfate; and
   adding 0.4 parts by weight of ammonium persulfate;

heating this mixture to 84° C.;
   adding a mixture of 63 parts by weight of vinyl acetate and 12 parts by weight of ethyl acrylate dropwise to the reactor over forty-five minutes while maintaining the temperature at 84° C.;
   cooling and filtering this mixture after its temperature reaches 94° C.;
   thereby providing a vinyl acetate-acrylic copolymer of high molecular weight and low residual tack, hereinafter referred to as polymer one;

charging 100 parts by weight of water to a reactor;
   adding 8 parts by weight of vinyl acetate;
   adding 1.5 parts by weight of methacrylic acid;
   adding 5.5 parts by weight of dioctyl maleate;
   adding 3.5 parts by weight of sodium lauryl sulfate;
   adding 1.5 parts by weight of hydroxy ethyl cellulose; and
   adding 0.6 parts by weight of ammonium persulfate;

heating this mixture to 84° C.;
   adding a mixture of 48 parts by weight of vinyl acetate and 31 parts by weight of dioctyl maleate dropwise to the reactor over a period of 90 minutes while maintaining the temperature at 84° C.;
   cooling and filtering this mixture after the temperature rises to 96° C.;
   thereby providing a vinyl acetate-maleate copolymer of low molecular weight and high residual tack, hereinafter referred to as polymer two;
   combining 86 to 88 parts by weight of said polymer one with 14 to 12 parts by weight of said polymer two to provide said film without polymeric composition.

6. The method of claim 5 further comprising the steps of:
   adding to said blend 0.08 to 0.14 parts by weight of hydroxethyl cellulose, 0.035 to 0.15 parts by weight of polyacrylic acid, 2 to 10 parts by weight of a pigment color dispersion, 0.004 to 0.10 parts by weight of fungicide, and 0.14 parts by weight of ammonium hydroxide.

7. The method of claim 6 further comprising the steps of:
   edging a pattern on a sheet of non-porous material;
   pouring said blend into said edged pattern;
   allowing said blend to set;
   removing said set blend from said edged, non-porous material.

8. The method of claim 6, further comprising the steps of applying said blend to a fingernail or toenail, allowing said blend to set, and removing said set blend from said fingernail or toenail.

* * * * *